US012496839B2

(12) United States Patent
Yanagimachi

(10) Patent No.: US 12,496,839 B2
(45) Date of Patent: Dec. 16, 2025

(54) ROLLED PAPER PRINTING APPARATUS

(71) Applicant: SEIKO EPSON CORPORATION, Tokyo (JP)

(72) Inventor: Daisuke Yanagimachi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 134 days.

(21) Appl. No.: 18/439,981

(22) Filed: Feb. 13, 2024

(65) Prior Publication Data

US 2024/0269999 A1 Aug. 15, 2024

(30) Foreign Application Priority Data

Feb. 15, 2023 (JP) ................................ 2023-021421

(51) Int. Cl.

*B41J 11/70* (2006.01)
*B41J 11/66* (2006.01)
*B41J 3/407* (2006.01)

(52) U.S. Cl.

CPC .............. *B41J 11/70* (2013.01); *B41J 11/666* (2013.01); *B41J 11/706* (2013.01); *B41J 3/4075* (2013.01); *B41J 11/66* (2013.01); *B41J 11/703* (2013.01)

(58) Field of Classification Search

CPC ......... B41J 11/70; B41J 11/666; B41J 11/706; B41J 3/4075; B41J 11/66; B41J 11/703; B41J 15/042; B41J 15/046

See application file for complete search history.

(56) References Cited

U.S. PATENT DOCUMENTS

| | | | | |
|---|---|---|---|---|
| 12,064,961 | B2 * | 8/2024 | Ukai | B41J 11/70 |
| 2003/0172792 | A1 * | 9/2003 | Imai | B41J 11/666 83/614 |
| 2011/0158731 | A1 | 6/2011 | Suzuki | |
| 2014/0125000 | A1 * | 5/2014 | Suzuki | B41J 11/70 270/1.01 |
| 2023/0131777 | A1 * | 4/2023 | Yamamoto | B41J 15/042 347/104 |
| 2023/0191810 | A1 * | 6/2023 | Mochizuki | B41J 11/0045 400/621 |

FOREIGN PATENT DOCUMENTS

JP 2011-136472 A 7/2011

* cited by examiner

*Primary Examiner* — Henok D Legesse
(74) *Attorney, Agent, or Firm* — WORKMAN NYDEGGER

(57) ABSTRACT

A rolled paper printing apparatus includes a roller, a cutter capable of cutting the rolled paper and including a first blade and a second blade, a first blade-side guide capable of guiding, from the side of the first blade, the paper transported, and a paper guide including a first guide and a second guide. The paper guide includes a first arm on which the first guide is mounted rotatably about a first shaft, a second arm on which the second guide is mounted rotatably about a second shaft, and an arm shaft that rotatably supports the first arm and the second arm. The first guide and the second guide are pushed by the first blade moving in the first direction, and move in the first direction while rotating from a first position at which the paper can be guided and reach a second position.

7 Claims, 6 Drawing Sheets

ROLLED PAPER PRINTING APPARATUS

The present application is based on, and claims priority from JP Application Serial Number 2023-021421, filed Feb. 15, 2023, the disclosure of which is hereby incorporated by reference herein in its entirety.

BACKGROUND

1. Technical Field

The present disclosure relates to a rolled paper printing apparatus.

2. Related Art

In the related art, as disclosed in JP-A-2011-136472, a printer is known, the printer including a cutter mechanism which stores rolled paper, includes a movable blade and a fixed blade, and cuts the paper, and a movable back feed (BF) guide which is provided in an area where the movable blade enters when the paper is cut and projects to a transport path side more than the fixed blade when the paper is not cut.

However, in the printer described in JP-A-2011-136472, since the moving range of the back feed (BF) guide is wide, there is a possibility that the size of the printer increases.

SUMMARY

According to an aspect of the present disclosure, a rolled paper printing apparatus includes a roller pulling out paper from rolled paper and transporting the paper in a transport direction, a cutter configured to cut the paper downstream in the transport direction of the roller and including a second blade and a first blade movable in a first direction toward the second blade, a first blade-side guide configured to guide, from the side of the first blade, the paper transported between the first blade and the second blade of the cutter, and a paper guide including a first guide and a second guide configured to guide the paper from the side of the second blade. The paper guide includes a first arm on which the first guide is mounted rotatably about a first shaft, a second arm on which the second guide is mounted rotatably about a second shaft, and an arm shaft that rotatably supports the first arm and the second arm. The first guide and the second guide are pushed by the first blade moving in the first direction, and move in the first direction while rotating from a first position at which the paper can be guided and reach a second position.

DESCRIPTION OF EMBODIMENTS

1. Embodiment

1-1. Configuration of Rolled Paper Printing Apparatus

Figure 4:
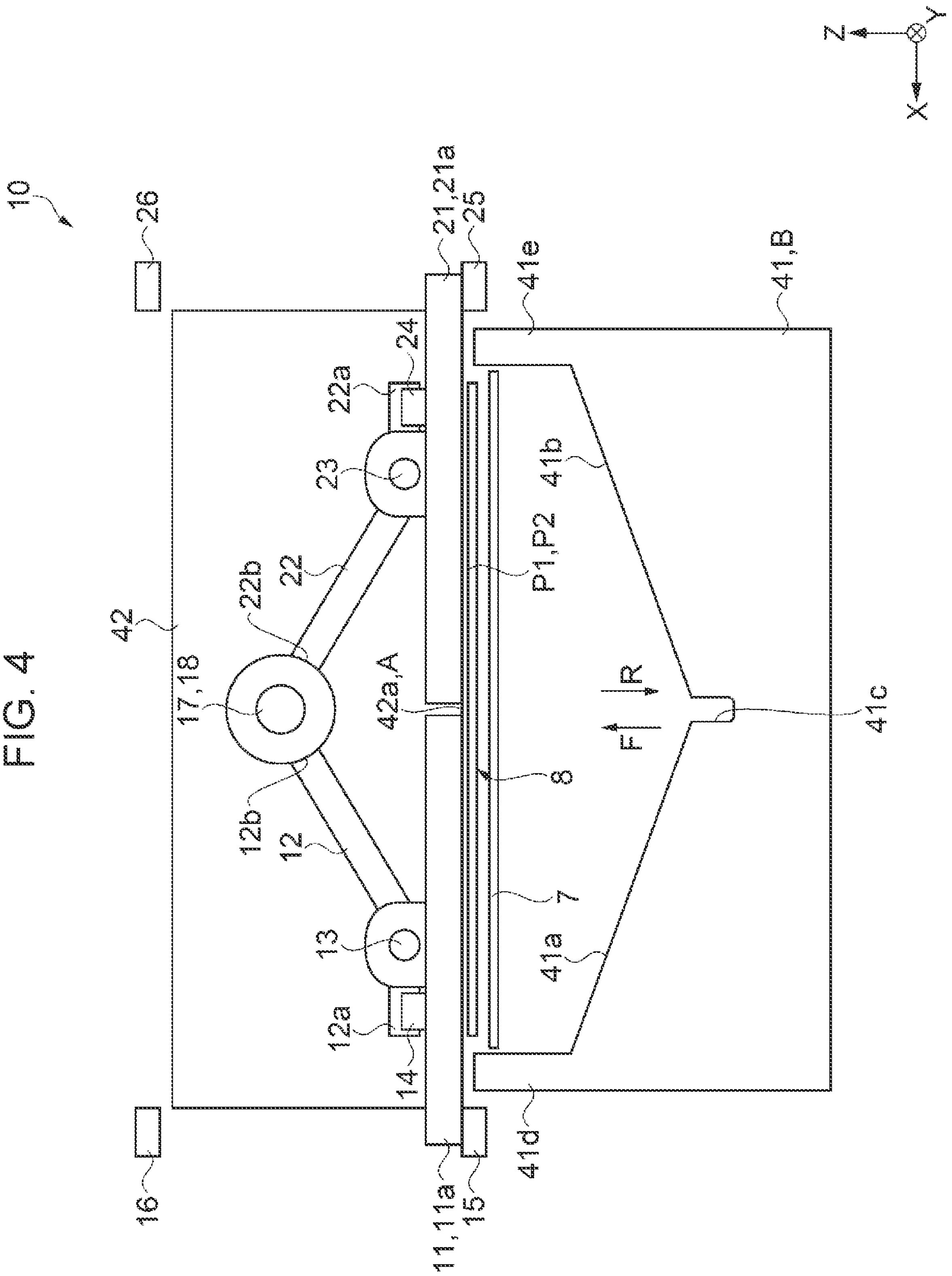
FIG. 4 is a schematic view mainly illustrating guides and a cutter when the guides are at a first position.
Figure 5:
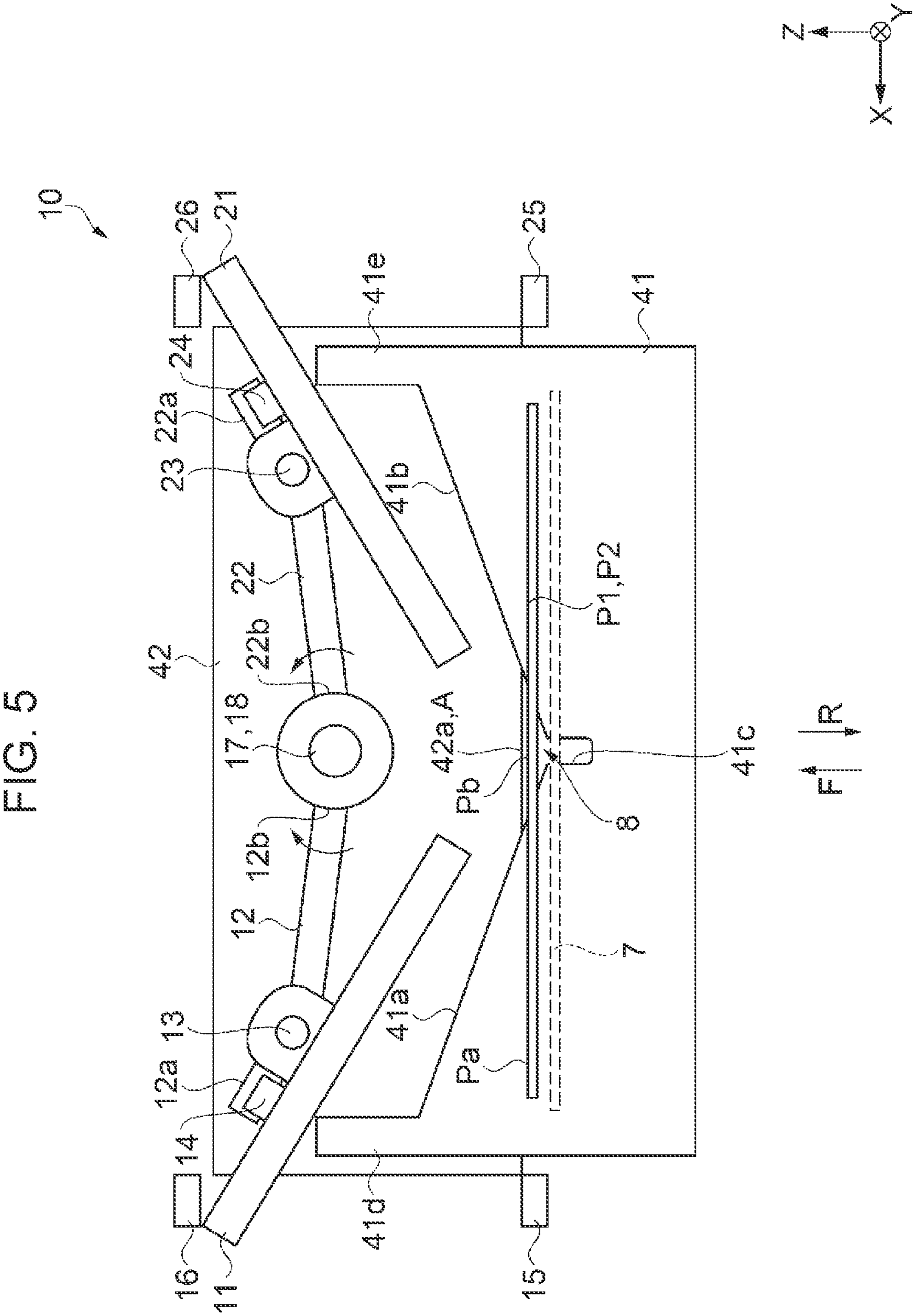
FIG. 5 is a schematic view mainly illustrating the guides and the cutter when the guides move from the first position to a second position.
Figure 6:
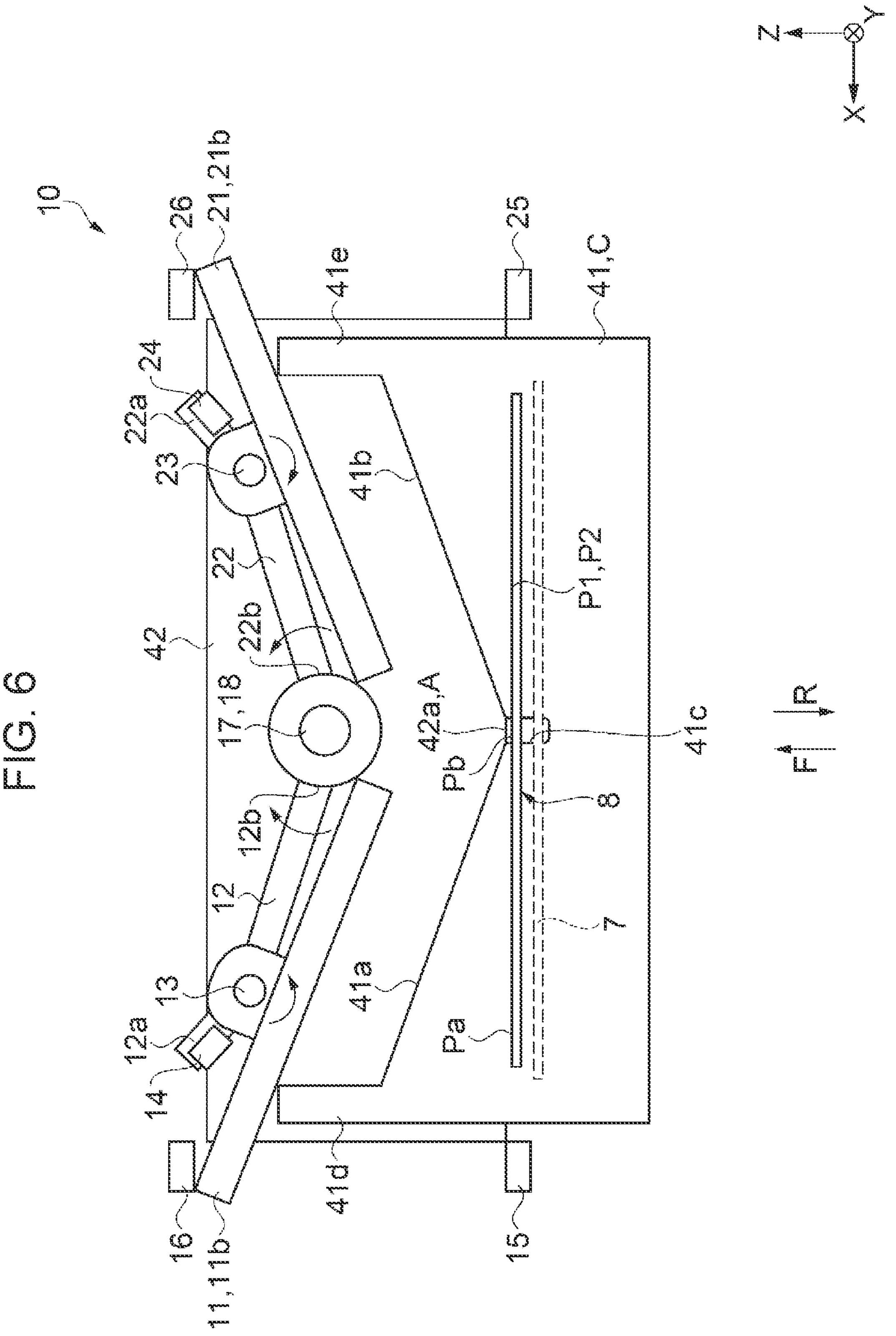
FIG. 6 is a schematic view mainly illustrating the guides and the cutter when the guides are at the second position.

Hereinafter, an embodiment will be described with reference to the drawings. Directions in the drawings will be described using a three-dimensional coordinate system in which an X axis, a Y axis, and a Z axis are orthogonal to each other. For convenience of description, the positive direction of the Z axis is referred to as an upward direction or simply up and the negative direction is referred to as a downward direction or simply down, the positive direction of the X axis is referred to as a right direction or simply right and the negative direction is referred to as a left direction or simply left, and the positive direction of the Y axis is referred to as a front direction or simply front and the negative direction is referred to as a rear direction or simply rear. In FIGS. 4 to 6, since the left side of the drawings is the positive direction of the X axis, this direction is referred to as right or the like in the following description.

For example, a rolled paper printing apparatus 1 according to the embodiment is used in a point of sale (POS) system. Hereinafter, the rolled paper printing apparatus 1 is simply referred to as a printing apparatus 1.

The printing apparatus 1 is installed on a counter or the like where accounting is performed in a store. Since an installation space on a counter is limited, miniaturization of the printing apparatus 1 is required.

Figure 1:
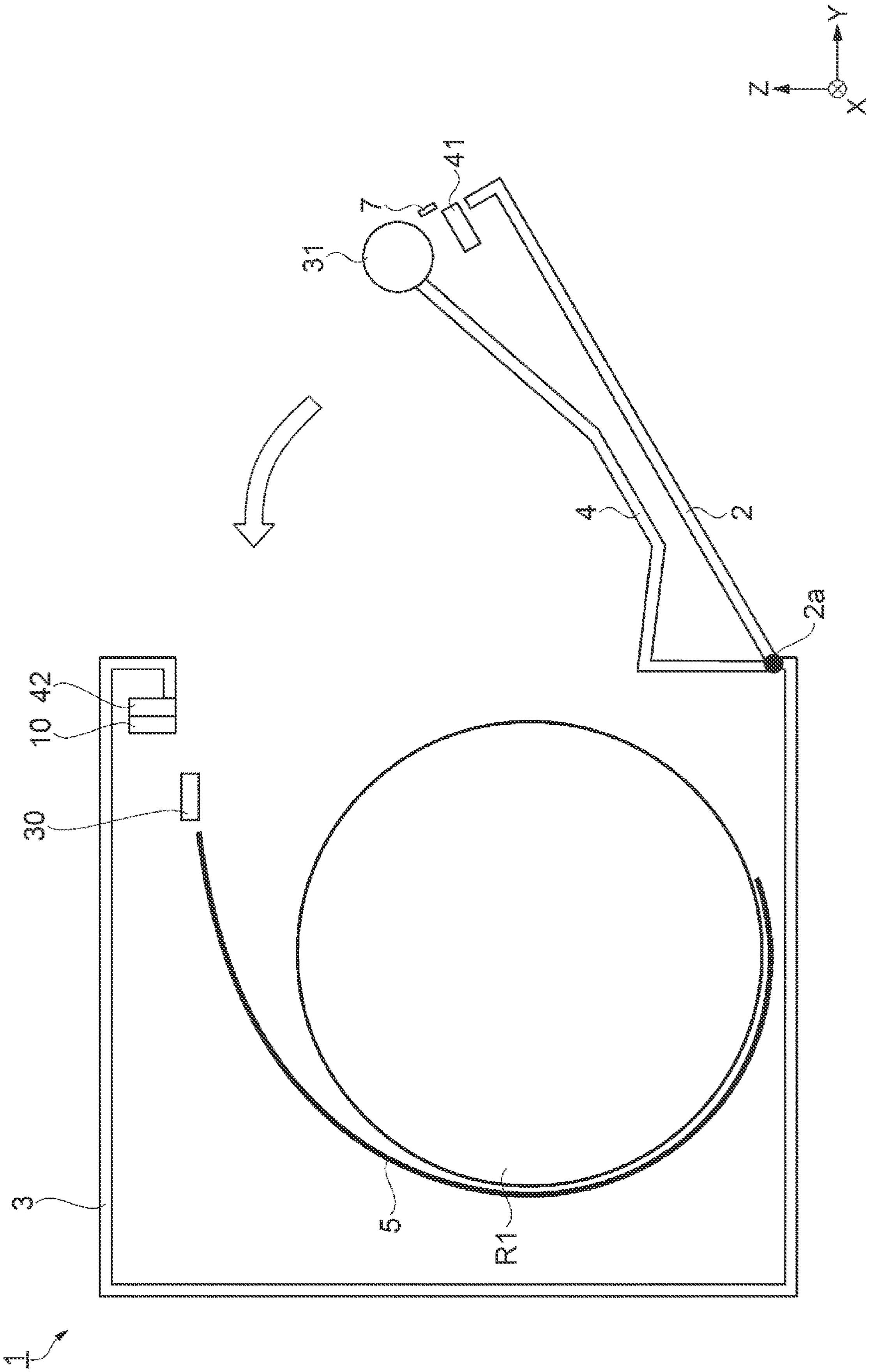
FIG. 1 is a cross-sectional view illustrating a configuration of a rolled paper printing apparatus when a cover is opened.

As illustrated in FIG. 1, a cover 2 is rotatable about a hinge **2*a* of a case 3. A user can open the cover 2 and store rolled paper R1 in the case 3**.

A roller 31, a first blade 41 constituting a cutter 40 to be described later, and a first blade-side guide 7 are mounted on the cover 2.

On the other hand, a paper guide 10, a head 30, a second blade 42 constituting the cutter 40, and a second rolled paper guide 5 are mounted on the case 3.

Figure 2:
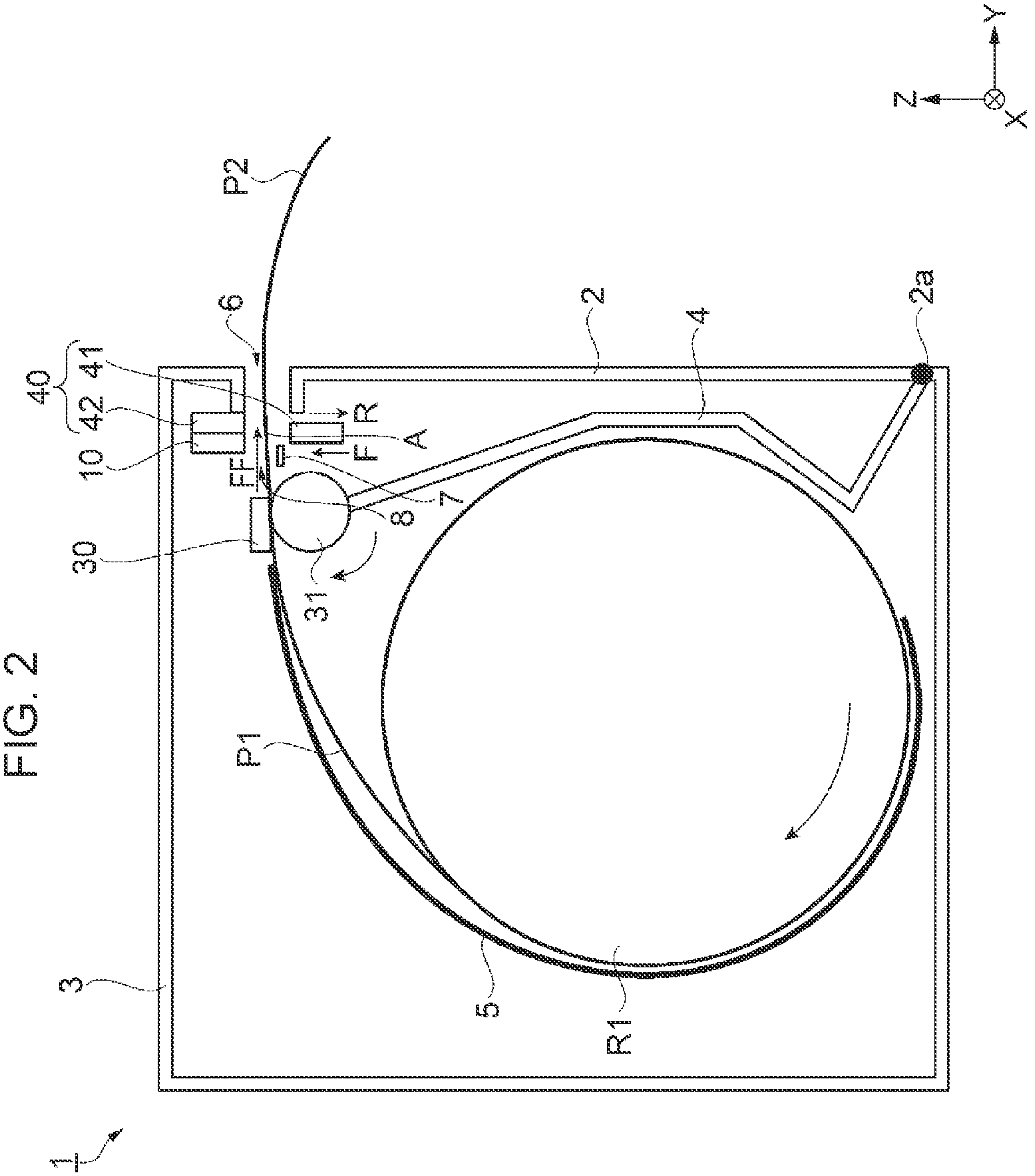
FIG. 2 is a cross-sectional view illustrating a configuration of the rolled paper printing apparatus when the cover is closed.

As illustrated in FIG. 2, when the cover 2 is closed, the roller 31 and the head 30, the first blade 41 and the second blade 42 of the cutter 40, and the first blade-side guide 7 and the paper guide 10 are respectively positioned so as to face each other. The cutter 40 is positioned downstream in a transport direction FF with respect to the roller 31 and the head 30.

When the cover 2 is closed, a discharge port 6 is formed between the cover 2 and the case 3. The discharge port 6 is positioned downstream in the transport direction FF with respect to the cutter 40. The rolled paper R1 is rotatably supported by a first rolled paper guide 4 of the cover 2 and the second rolled paper guide 5 of the case 3.

The roller 31 is formed in a columnar shape using a material such as a flexible resin such as rubber. The roller 31 is at a position facing the head 30 via paper P1, and is also referred to as a platen.

The roller 31 transports the paper P1 by a friction feed method, which is a method of transport by friction. The roller 31 rotates clockwise, pulls out the paper P1 from the rolled paper R1, and transports the paper P1 in the transport direction FF. At this time, the rolled paper R1 also rotates clockwise. The transport direction FF is a direction toward the front. The roller 31 can also rotate counterclockwise, and can also transport the paper P1 in a direction opposite to the transport direction FF.

For example, the head 30 is a line thermal head. The head 30 includes a pressing mechanism, illustration of which is omitted, for pressing toward the roller 31. The paper P1 is held between the roller 31 and the head 30 at a predetermined pressure by the pressing mechanism.

While the paper P1 is transported with the transport surface in contact with the roller 31, the printing surface coated with a coloring agent is brought into contact with the head 30, and the paper is colored and printed by the heat generated by the head 30. The long paper P1 is wound as the rolled paper R1 such that the outer side is the printing surface.

The paper P1 printed by the head 30 is transported by the roller 31 in the transport direction FF by a predetermined distance, and is discharged from the discharge port 6.

The first blade 41 and the second blade 42 of the cutter 40 have a plate shape. The first blade 41 is reciprocated in a first direction F and a second direction R by a motor, which is not illustrated. The first direction F and the second direction R are opposite directions. The position of the first blade 41 is detected by a sensor, which is not illustrated. The second blade 42 that does not move is also referred to as a fixed blade, and the first blade 41 that can move is also referred to as a movable blade.

The first blade 41 cuts the paper P1 at a cut point A intersecting with the second blade 42 while moving in the first direction F toward the second blade 42. A paper piece P2 indicates the paper P1 cut by the cutter 40. After the paper P1 is cut, the first blade 41 moves in the second direction R away from the second blade 42.

In FIG. 2 and FIGS. 4 to 6, the upper side indicates the first direction F, and the lower side indicates the second direction R.

A transport path 8 through which the paper P1 can pass is formed between the first blade-side guide 7 and the paper guide 10. The first blade-side guide 7 can guide the paper P1 from the first blade 41 side, which is the lower side. On the other hand, the paper guide 10 can guide the paper P1 from the second blade 42 side, which is the upper side.

The first blade-side guide 7 is disposed downstream relative to the roller 31 and upstream relative to the first blade 41 in the transport direction FF. The paper guide 10 is disposed downstream relative to the head 30 and upstream relative to the second blade 42 in the transport direction FF.

As will be described later, the first blade-side guide 7 and the paper guide 10 can also guide the paper piece P2 that is partially connected to the paper P1.

Figure 3:
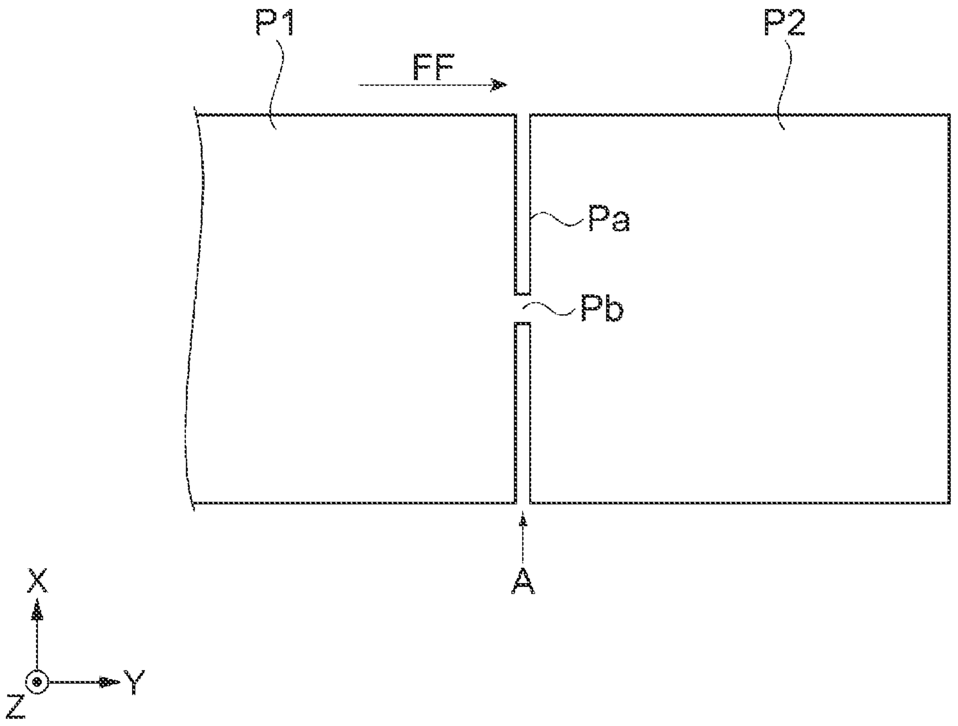
FIG. 3 is a schematic view illustrating cut paper.

FIG. 3 illustrates the paper P1 cut by the cutter 40 at the cut point A. The paper piece P2 is formed downstream relative to the cut point A in the transport direction FF. At the cut point A, a cut portion Pa that has been cut and an uncut portion Pb that is not cut are formed between the paper P1 and the paper piece P2.

The uncut portion Pb is formed by a notch 41*c* of the first blade 41 to be described later. The paper P1 and the paper piece P2 are partially connected by the uncut portion Pb. Since the paper piece P2 is partially connected to the long paper P1, the paper piece P2 does not fall from the printing apparatus 1 and is not scattered even when a user does not take out the paper piece P2.

The process in which the cutter 40 partially cuts the paper P1 so as to form the uncut portion Pb is referred to as so-called partial cutting.

As illustrated in FIG. 4, the cutter 40 includes the second blade 42 and the first blade 41 movable in the first direction F toward the second blade 42, and can cut the paper P1 in the transport path 8 at the cut point A.

The second blade 42 includes a third blade edge 42*a* having a linear shape in the left-right direction. The cut point A is also the position of the third blade edge 42*a* of the second blade 42.

The first blade 41 before cutting the paper P1 is at a standby position B, which is the lowest position. On the other hand, as illustrated in FIG. 6 to be described later, the first blade 41 immediately after the end of cutting is at a cutting position C, which is the uppermost position. After the paper P1 is cut, the first blade 41 returns to the standby position B. The first blade 41 can reciprocate between the standby position B and the cutting position C.

The first blade 41 includes a first blade edge 41*a*, a second blade edge 41*b*, the notch 41*c*, a first projection 41*d*, and a second projection 41*e*.

The blade edge of the first blade 41 is V-shaped, and includes the first blade edge 41*a* and the second blade edge 41*b* that are inclined downward respectively from the right and left ends toward the center. The first blade 41 includes the notch 41*c* at the center of the V-shape, the notch being a portion where the blade edge is not formed. The notch 41*c* has a shape elliptically cut out downward.

The rectangular first projection 41*d* and second projection 41*e* extend upward from the right and left ends of the first blade 41, respectively.

In the paper guide 10, the components are arranged bilaterally symmetrically with respect to an arm shaft 17. Movement, rotation, and the like of each component are also bilaterally symmetrical.

The paper guide 10 is constituted by including a first guide 11 on the right side and a second guide 21 on the left side. The paper P1 between the first blade 41 and the second blade 42 in the transport path 8 is guided from the first blade 41 side by the first blade-side guide 7, and is guided from the second blade 42 side by the first guide 11 and the second guide 21.

When the paper piece P2 is partially connected to the paper P1, the paper piece P2 is also guided by the first blade-side guide 7, the first guide 11, and the second guide 21 in a manner similar to the paper P1.

The paper guide 10 includes a first arm 12 on which the first guide 11 is mounted rotatably about a first shaft 13, and a second arm 22 on which the second guide 21 is mounted rotatably about a second shaft 23.

As described above, the paper guide 10 includes, bilaterally symmetrically with respect to the arm shaft 17, the first arm 12 and the second arm 22, and the components mounted on the first and second arms 12 and 22 such as the first guide 11 and the second guide 21. In the paper guide 10, movement and rotation of the first arm 12 and the second arm 22 and each component mounted on the first and second arms 12 and 22 such as the first guide 11 and the second guide 21, are bilaterally symmetrical.

One end 12*b* of the first arm 12 and one end 22*b* of the second arm 22 are attached to the arm shaft 17. The arm shaft 17 rotatably supports the first arm 12 and the second arm 22.

An elastic member 18 is mounted on the arm shaft 17 and pushes the one end 12*b* of the first arm 12 and the one end 22*b* of the second arm 22 downward. For example, the elastic member 18 is a spring such as a torsion coil spring or a torsion spring.

The elastic member 18 acts to rotate the first arm 12 counterclockwise about the arm shaft 17, and acts to rotate the second arm 22 in the opposite clockwise direction.

That is, the elastic member 18 acts to move the other end 12*a* of the first arm 12 and the other end 22*a* of the second arm 22 downward while rotating them.

The first guide 11, the first shaft 13, and a first stopper 14 are mounted on the other end 12*a* of the first arm 12. The second guide 21, the second shaft 23, and a second stopper 24 are mounted on the other end 22*a* of the second arm 22.

As a result, the elastic member 18 acts to move the first guide 11 and the second guide 21 downward while rotating them.

As illustrated in FIG. 4, when the first blade 41 is at the standby position B, the first guide 11 and the second guide 21 are pushed by the elastic member 18 and are at first positions 11*a* and 21*a*, which are lower positions. At this time, in the example of FIG. 4, the first guide 11 and the second guide 21 are not in contact with the first projection 41*d* and the second projection 41*e* of the first blade 41. When the first blade 41 is at the standby position B, the first guide 11 and the second guide 21 may be in contact with the first projection 41*d* and the second projection 41*e* of the first blade 41.

When the first guide 11 and the second guide 21 are at the first positions 11*a* and 21*a*, the guides are at positions facing the first blade-side guide 7, and can form the transport path 8 capable of guiding the paper P1 and the paper piece P2. At this time, the first guide 11 and the second guide 21 are in a linear state in the left-right direction, and are parallel to the first blade-side guide 7.

The first positions 11*a* and 21*a* and second positions 11*b* and 21*b* to be described later indicate the positions of the first guide 11 and the second guide 21 in the vertical direction. As described above, since the first guide 11 and the second guide 21 bilaterally symmetrically move and rotate, their positions in the vertical direction are also the same.

As illustrated in FIG. 4, the first positions 11*a* and 21*a* are positions when the first blade 41 is at the standby position B, and are positions where the first guide 11 and the second guide 21 are at the lowest positions.

On the other hand, as illustrated in FIG. 6 to be described later, the second positions 11*b* and 21*b* are positions when the first blade 41 is at the cutting position C, and are positions where the first guide 11 and the second guide 21 are at the uppermost positions.

A third stopper 15 capable of coming into contact with the first guide 11 and a fourth stopper 25 capable of coming into contact with the second guide 21 are arranged in the case 3.

The first stopper 14 capable of coming into contact with the first guide 11 is mounted on the other end 12*a* of the first arm 12. The second stopper 24 capable of coming into contact with the second guide 21 is mounted on the other end 22*a* of the second arm 22.

As described above, the elastic member 18 can move the first guide 11 and the second guide 21 downward while rotating them.

The first stopper 14 and the third stopper 15 can come into contact with the first guide 11 from above and below so as to sandwich the first guide 11 at the first position 11*a*, and stop rotation and movement of the first guide 11. As a result, the first guide 11 can maintain the state of being parallel to the first blade-side guide 7.

Also, the second stopper 24 and the fourth stopper 25 can come into contact with the second guide 21 from above and below so as to sandwich the second guide 21 at the first position 21*a*, and stop rotation and movement of the second guide 21. As a result, the second guide 21 can also maintain the state of being parallel to the first blade-side guide 7.

Next, as illustrated in FIG. 5, the first blade 41 moves in the first direction F from the standby position B toward the second blade 42. At this time, the first blade 41 cuts the paper P1 while intersecting with the second blade 42 at the cut point A.

Specifically, the first blade edge 41*a* and the second blade edge 41*b* of the first blade 41 intersect with the third blade edge 42*a* of the second blade 42 from both ends and cut the paper P1, thereby forming the cut portion Pa.

With the movement of the first blade 41, the first projection 41*d* on the right and the second projection 41*e* on the left also move in the first direction F. The first projection 41*d* and the second projection 41*e* come into contact with the first guide 11 and the second guide 21, respectively, and move the first guide 11 and the second guide 21 upward in the first direction F against the pushing force of the elastic member 18. That is, when the first blade 41 moves in the first direction F, the first blade 41 pushes and moves the paper guide 10 upward.

The first projection 41*d* comes into contact with the first guide 11 from below on the right of the first shaft 13 and moves the first guide 11. The second projection 41*e* comes into contact with the second guide 21 from below on the left of the second shaft 23 and moves the second guide 21.

At this time, since the first stopper 14 on the first arm 12 is in contact with the first guide 11 from above on the right of the first shaft 13, the first guide 11 does not rotate about the first shaft 13. That is, since the first projection 41*d* comes into contact with the first guide 11 from below and the first stopper 14 comes into contact with the first guide 11 from above on the right of the first shaft 13, the first guide 11 does not rotate.

The first guide 11 moves upward while rotating clockwise about the arm shaft 17 together with the first arm 12. The first guide 11 is inclined such that the right end thereof faces upward and the left end thereof faces downward.

Similarly, since the second stopper 24 on the second arm 22 is in contact with the second guide 21 from above on the left of the second shaft 23, the second guide 21 does not rotate about the second shaft 23. That is, since the second projection 41*e* comes into contact with the second guide 21 from below and the second stopper 24 comes into contact with the second guide 21 from above on the left of the second shaft 23, the second guide 21 does not rotate.

The second guide 21 moves upward while rotating counterclockwise about the arm shaft 17 together with the second arm 22. The second guide 21 is inclined such that the left end thereof faces upward and the right end thereof faces downward.

When the first guide 11 and the second guide 21 move upward, the first guide 11 and the second guide 21 rotate in opposite directions. Since the first guide 11 and the second guide 21 move upward while rotating, the first guide 11 and the second guide 21 move away from the third stopper 15 and the fourth stopper 25, respectively. On the other hand, the first stopper 14 and the second stopper 24 maintain the state of being in contact with the first guide 11 and the second guide 21, respectively, by being pushed by the first projection 41*d* on the right and the second projection 41*e* on the left.

When the first blade 41 further moves in the first direction F, the upper ends of the first guide 11 and the second guide 21 come into contact with a fifth stopper 16 and a sixth stopper 26, respectively.

When the first guide 11 moves upward, the first guide 11 rotates about the arm shaft 17 until the first guide 11 comes into contact with the fifth stopper 16. Also, when the second guide 21 moves upward, the second guide 21 rotates about the arm shaft 17 until the second guide 21 comes into contact with the sixth stopper 26.

FIG. 6 indicates a state in which the first blade 41 moves in the first direction F and has reached the cutting position C, which is the uppermost position. At this time, the first blade edge 41*a* and the second blade edge 41*b* of the first blade 41 are beyond the position of the third blade edge 42*a* of the second blade 42, which is also the cut point A.

As a result, the first blade edge 41*a* and the second blade edge 41*b* of the first blade 41 intersect with the third blade edge 42*a* of the second blade 42, and as illustrated in FIG. 3, the cut portion Pa is formed between the paper P1 and the paper piece P2. On the other hand, the uncut portion Pb is formed between the paper P1 and the paper piece P2 by the notch 41*c* of the first blade 41 which does not intersect with the third blade edge 42*a* of the second blade 42.

At this time, the first guide 11 and the second guide 21 are pushed by the first projection 41*d* and the second projection 41*e* of the first blade 41 moving in the first direction F, and reach the second positions 11*b* and 21*b*.

FIG. 6 illustrates a state in which the first guide 11 and the second guide 21 are further pushed by the first projection 41*d* and the second projection 41*e* from the state illustrated in FIG. 5 in which the upper ends of the first guide 11 and the second guide 21 come into contact with the fifth stopper 16 and the sixth stopper 26, respectively.

The first guide 11 in contact with the fifth stopper 16 and the second guide 21 in contact with the sixth stopper 26 rotate about the first shaft 13 and the second shaft 23, respectively, when the first guide 11 and the second guide 21 reach the second positions 11*b* and 21*b*. The first guide 11 rotates counterclockwise, and the second guide 21 rotates clockwise. The first guide 11 and the second guide 21 rotate in opposite directions also when the first guide 11 and the second guide 21 move upward and reach the second positions 11*b* and 21*b*.

Since the upper ends of the first guide 11 and the second guide 21 come into contact with the fifth stopper 16 and the sixth stopper 26, the first guide 11 and the second guide 21 do not move upward any further.

The lower ends of the first guide 11 and the second guide 21 move upward by being pushed by the first projection 41*d* and the second projection 41*e*. The lower ends of the first guide 11 and the second guide 21 approach the arm shaft 17.

At this time, the first guide 11 can operate in accordance with the so-called principle of leverage in which the fifth stopper 16 in contact serves as the fulcrum, the first projection 41*d* in contact serves as the point of effort, and the first shaft 13 serves as the point of load.

That is, when the first guide 11 is pushed by the first projection 41*d*, the first guide 11 moves the first shaft 13 upward with the fifth stopper 16 as the fulcrum. At this time, the first guide 11 rotates counterclockwise about the first shaft 13. Even when the first guide 11 rotates in this way, the first guide 11 maintains the inclined state in which the right end in contact with the fifth stopper 16 is directed upward and the left end is directed downward.

As a result, even when the first guide 11 is pushed by the first projection 41*d* and moves to the second position 11*b*, the first guide 11 including the right end at the uppermost position does not move to an upper position beyond the fifth stopper 16.

Similarly, the second guide 21 can operate in accordance with the so-called principle of leverage in which the sixth stopper 26 in contact serves as the fulcrum, the second projection 41*e* in contact serves as the point of effort, and the second shaft 23 serves as the point of load.

That is, when the second guide 21 is pushed by the second projection 41*e*, the second guide 21 moves the second shaft 23 upward with the sixth stopper 26 as the fulcrum. At this time, the second guide 21 rotates clockwise about the second shaft 23. Even when the second guide 21 rotates in this way, the second guide 21 maintains the inclined state in which the left end in contact with the sixth stopper 26 is directed upward and the right end is directed downward.

As a result, even when the second guide 21 is pushed by the second projection 41*e* and moves to the second position 21*b*, the second guide 21 including the left end at the uppermost position does not move to an upper position beyond the sixth stopper 26.

With the movement of the first shaft 13, the first arm 12 on which the first shaft 13 is mounted rotates clockwise about the arm shaft 17. The first stopper 14 mounted on the first arm 12 moves upward away from the first guide 11.

However, since the first stopper 14 is positioned closer to the first shaft 13 than to the right end of the first guide 11, the first stopper 14 is not positioned upper than the right end of the first guide 11. The first stopper 14 does not move upward beyond the position of the fifth stopper 16.

Similarly, with the movement of the second shaft 23, the second arm 22 on which the second shaft 23 is mounted rotates counterclockwise about the arm shaft 17. The second stopper 24 mounted on the second arm 22 moves upward away from the second guide 21.

However, since the second stopper 24 is positioned closer to the second shaft 23 than to the left end of the second guide 21, the second stopper 24 is not positioned upper than the left end of the second guide 21. The second stopper 24 does not move upward beyond the position of the sixth stopper 26.

In this way, the first guide 11 and the second guide 21 are pushed by the first blade 41 moving in the first direction F, move upward while rotating from the first positions 11*a* and 21*a* at which the paper P1 can be guided, and reach the second positions 11*b* and 21*b*.

At this time, the paper guide 10 including the first guide 11, the second guide 21, the first stopper 14, and the second stopper 24 does not move further upward with respect to the positions of the fifth stopper 16 and the sixth stopper 26. As a result, the distance of upward movement of the paper guide 10 including the first guide 11, the second guide 21, the first stopper 14, and the second stopper 24 can be reduced.

That is, even when the first blade 41 moves in the first direction F and reaches the cutting position C, and the paper guide 10 is pushed by the first blade 41 and reaches the uppermost position, the paper guide 10 does not go beyond the positions of the fifth stopper 16 and the sixth stopper 26.

With such configuration of the paper guide 10, the distance of upward movement of the paper guide 10 can be reduced. As a result, the printing apparatus 1 can be miniaturized.

After the paper P1 is cut at the cutting position C indicated in FIG. 6, the first blade 41 moves in the second direction R, passes through the position indicated in FIG. 5 again, and returns to the standby position B indicated in FIG. 4. At this time, by the elastic force of the elastic member 18, the first guide 11, the second guide 21, the first arm 12, and the second arm 22 each move downward while rotating in the direction opposite to that in FIGS. 5 and 6, and return to the positions in FIG. 4.

When the first blade 41 returns, as illustrated in FIG. 4, the paper P1 and the paper piece P2 partially connected to the paper P1 are in the transport path 8.

Meanwhile, as illustrated in FIG. 3, the cut portion Pa is formed between the paper P1 and the paper piece P2. Since the cut portion Pa of the paper piece P2 is not connected to the paper P1, there is nothing to support the cut portion Pa, and the cut portion Pa is in a free state. Therefore, the cut portion Pa may be curved in the vertical direction or the like.

When the paper P1 is transported by the roller 31 in the direction opposite to the transport direction FF with the cut portion Pa of the paper piece P2 curved, the curved cut portion Pa of the paper piece P2 may be caught in the first blade 41, the second blade 42, or the like.

In this case, as illustrated in FIG. 4, the first blade-side guide 7 and the first guide 11 and the second guide 21 of the paper guide 10 can guide the paper piece P2, including the cut portion Pa of the paper piece P2, in a manner similar to the paper P1.

As a result, even in a state where the cut portion Pa of the paper piece P2 is curved, the curved cut portion Pa of the paper piece P2 is prevented from being caught in the first blade 41, the second blade 42, or the like when the paper P1 is transported by the roller 31 in the direction opposite to the transport direction FF.

Also, when the first blade 41 moves in the first direction F and cuts the paper P1, the cut portion Pa of the paper piece P2 which is in a free state may move upward along with the movement of the first blade edge 41*a* and the second blade edge 41*b*.

However, when the first blade 41 moves in the second direction R and returns, the first guide 11 and the second guide 21 of the paper guide 10 can also move downward while coming into contact with the cut portion Pa of the paper piece P2, and the cut portion Pa of the paper piece P2 can be moved to the position of the transport path 8.

According to the above-described embodiment, the printing apparatus 1 includes the first blade-side guide 7 capable of guiding, from the side of the first blade 41, the paper P1 transported between the first blade 41 and the second blade 42 of the cutter 40, and the paper guide 10 including the first guide 11 and the second guide 21 capable of guiding the paper P1 from the side of the second blade 42. The paper guide 10 includes the first arm 12 on which the first guide 11 is mounted rotatably about the first shaft 13, the second arm 22 on which the second guide 21 is mounted rotatably about the second shaft 23, and the arm shaft 17 that rotatably supports the first arm 12 and the second arm 22.

The first guide 11 and the second guide 21 are pushed by the first blade 41 moving in the first direction F, move in the upward first direction F while rotating from the first positions 11*a* and 21*a* at which the paper P1 can be guided, and reach the second positions 11*b* and 21*b*.

As a result, with the first guide 11 and the second guide 21, which can guide the paper P1, being pushed by the first blade 41 and moving in the first direction F while rotating, the distance of movement in the first direction F can be reduced and the printing apparatus 1 can be miniaturized.

Although the embodiment has been described in detail with reference to the drawings, specific configurations are not limited to the embodiment, and changes, substitutions, deletions, and the like may be made without departing from the gist of the present disclosure.

In the above description, an example has been given in which the head 30 of the printing apparatus 1 is a line thermal head. However, the head 30 may be any type. For example, the head 30 may be a line type ink jet head.

Description for the paper P1 has been given with heat-sensitive paper as an example, but the paper may be plain paper when the head 30 is an ink jet head.

In the above description, an example has been given in which the roller 31, the first blade 41 constituting the cutter 40, and the first blade-side guide 7 are mounted on the cover 2, and the paper guide 10, the head 30, and the second blade 42 constituting the cutter 40 are mounted on the case 3. However, each component may be reversely mounted on the cover 2 and the case 3. In this case, the paper P1 is wound as the rolled paper R1 such that the outer side is the transport surface.

Also, the paper P1 may be label paper in which labels are attached to a mount at predetermined intervals.

In the above description, an example has been given in which the paper guide 10 is disposed downstream with respect to the head 30 and upstream with respect to the second blade 42 in the transport direction FF. However, the paper guide 10 may be disposed downstream with respect to the second blade 42. After the first blade 41 moves and cuts the paper P1, the paper guide 10 can return the cut paper piece P2 that has run on the second blade 42 to the transport path 8. Furthermore, the paper guide 10 can guide the paper piece P2 when the paper P1 and the paper piece P2 are transported by the roller 31 in the direction opposite to the transport direction FF.

What is claimed is:

1. A rolled paper printing apparatus comprising:

a roller pulling out paper from rolled paper and transporting the paper in a transport direction;

a cutter configured to cut the paper downstream in the transport direction of the roller, the cutter including a second blade and a first blade movable in a first direction toward the second blade;

a first blade-side guide configured to guide the paper transported between the first blade and the second blade of the cutter from a side of the first blade; and a paper guide including a first guide and a second guide configured to guide the paper from a side of the second blade, wherein the paper guide includes a first arm on which the first guide is mounted rotatably about a first shaft, a second arm on which the second guide is mounted rotatably about a second shaft, and an arm shaft rotatably supporting the first arm and the second arm, and the first guide and the second guide are pushed by the first blade moving in the first direction, move in the first direction while rotating from a first position at which the paper can be guided, and reach a second position.

2. The rolled paper printing apparatus according to claim 1, wherein one end of the first arm is rotatably supported by the arm shaft, and an other end of the first arm rotatably mounts the first guide via the first shaft, one end of the second arm is rotatably supported by the arm shaft, and an other end of the second arm rotatably mounts the second guide via the second shaft, and the first guide and the second guide are rotatable in opposite directions when the first guide and the second guide move in the first direction.

3. The rolled paper printing apparatus according to claim 1, wherein a first stopper mounted on the first arm and configured to come into contact with the first guide, and a third stopper configured to come into contact with the first guide at the first position are included, the first stopper and the third stopper come into contact with the first guide and stop rotation at the first position, a second stopper mounted on the second arm and configured to come into contact with the second guide, and a fourth stopper configured to come into contact with the second guide at the first position are included, and the second stopper and the fourth stopper come into contact with the second guide and stop rotation at the first position.

4. The rolled paper printing apparatus according to claim 1, wherein a fifth stopper configured to come into contact with the first guide is included, the fifth stopper being configured to come into contact with the first guide and rotate the first guide about the first shaft when the first guide moves in the first direction and reaches the second position, and a sixth stopper configured to come into contact with the second guide is included, the sixth stopper being configured to come into contact with the second guide and rotate the second guide about the second shaft when the second guide moves in the first direction and reaches the second position.

5. The rolled paper printing apparatus according to claim 4, wherein when the first guide moves in the first direction, the first guide rotates about the arm shaft until the first guide comes into contact with the fifth stopper, and when the second guide moves in the first direction, the second guide rotates about the arm shaft until the second guide comes into contact with the sixth stopper.

6. The rolled paper printing apparatus according to claim 1, wherein an elastic member pushing the first arm and the second arm is mounted on the arm shaft, and the elastic member moves the first guide and the second guide in a second direction that is an opposite direction to the first direction.

7. The rolled paper printing apparatus according to claim 1, wherein the first blade has a notch, and when the paper is cut, an uncut portion can be formed in the paper by the notch.

* * * * *